(12) United States Patent
Ruck et al.

(10) Patent No.: US 11,578,811 B2
(45) Date of Patent: Feb. 14, 2023

(54) VALVE UNIT

(71) Applicant: BUERKERT WERKE GMBH & CO. KG, Ingelfingen (DE)

(72) Inventors: Theresa Ruck, Ingelfingen (DE); Simone Holzinger, Ingelfingen (DE)

(73) Assignee: BUERKERT WERKE GMBH & CO. KG

( * ) Notice: Subject to any disclaimer, the term of this patent is extended or adjusted under 35 U.S.C. 154(b) by 0 days.

(21) Appl. No.: 17/674,507

(22) Filed: Feb. 17, 2022

(65) Prior Publication Data
US 2022/0260168 A1 Aug. 18, 2022

(30) Foreign Application Priority Data
Feb. 17, 2021 (DE) .................... 10 2021 103 772.7

(51) Int. Cl.
*F16K 27/02* (2006.01)
*F16K 31/06* (2006.01)

(52) U.S. Cl.
CPC ........ *F16K 27/029* (2013.01); *F16K 31/0655* (2013.01)

(58) Field of Classification Search
CPC ..................... F16K 27/029; F16K 31/0655
See application file for complete search history.

(56) References Cited

U.S. PATENT DOCUMENTS

| | | | |
|---|---|---|---|
| 2,693,814 A * | 11/1954 | Richards | F16K 31/1266 251/42 |
| 3,993,091 A | 11/1976 | Loveless | 137/269 |
| 5,333,647 A * | 8/1994 | Fukano | F16K 27/003 137/271 |
| 6,026,834 A * | 2/2000 | Azima | G05D 7/0635 137/1 |
| 6,772,989 B2 | 8/2004 | Enzaki et al. | 251/63.5 |

FOREIGN PATENT DOCUMENTS

CH 693721 9/2002 ............ F16K 49/00

* cited by examiner

*Primary Examiner* — Eric Keasel
(74) *Attorney, Agent, or Firm* — Hayes Soloway P.C.

(57) ABSTRACT

A valve unit has a fluid housing through which a fluid duct extends from a first opening across a valve seat to a second opening, a valve drive connected to the fluid housing and configured to drive a valve closing body cooperating with the valve seat, the valve closing body coming into contact with the fluid in operation on the face side facing the valve seat and on a side facing away from the valve seat, and a connecting plate having a connecting surface to which the fluid housing can be mounted and in which a fluid supply duct and a fluid outlet duct are formed. The fluid housing is adapted to be mounted to the connecting plate in a first position and in a second position rotated in relation to the first position through 180 degrees relative to an imaginary axis of rotation extending perpendicularly to the connecting surface, wherein during operation of the valve unit, with a direction of flow of the fluid through the connecting plate remaining unchanged, a flow over the seat takes place in the first position and a flow under the seat takes place in the second position.

12 Claims, 4 Drawing Sheets

VALVE UNIT

FIELD OF THE INVENTION

The invention relates to a valve unit having a fluid housing adapted to be mounted to a connecting plate in two different positions.

BACKGROUND

Depending on the application and field of use of a valve unit, a flow over the seat or a flow under the seat of a valve may be desired. This can be achieved in a very simple way by using two different valve components that provide for the flow to be guided accordingly. The structural effort does not involve a complete restructuring of the valve unit, so that a valve manufacturer can offer such different valve units without immense additional expense.

It is an object of the present invention to provide a valve unit which allows the flow against the valve seat to be changed in a particularly simple manner in an existing system, so that such valve units become even more cost-effective.

SUMMARY

The invention provides a valve unit having a fluid housing through which a fluid duct extends from a first opening across a valve seat to a second opening, a valve drive connected to the fluid housing and configured to drive a valve closing body cooperating with the valve seat, the valve closing body coming into contact with the fluid in operation on the face side facing the valve seat and on a side facing away from the valve seat, and having a connecting plate having a connecting surface to which the fluid housing can be mounted and in which a fluid supply duct and a fluid outlet duct are formed, which each open into the connecting surface and which, in the assembled state of the valve unit, are in fluid communication with the fluid duct in the fluid housing by the first and second openings. The fluid housing is adapted to be mounted to the connecting plate in a first position and in a second position rotated in relation to the first position through 180 degrees relative to an imaginary axis of rotation extending perpendicularly to the connecting surface, wherein during operation of the valve unit, with a direction of flow of the fluid through the connecting plate remaining unchanged, a flow over the seat takes place in the first position and a flow under the seat takes place in the second position.

A valve unit of this type has the advantage that a flow direction relative to the valve seat can be changed in an existing system without changing a direction of flow of the fluid through the connecting plate. According to the invention, this is possible without the need for different valve components.

Flow over the seat is understood to mean that the fluid flows in the same direction as a valve closing force of the valve closing body acts. This allows the fluid to press the valve closing body onto the valve seat when the valve seat is closed, thereby increasing the closing force of the valve closing body.

Flow under the seat is understood to mean that the fluid presses against the valve closing body when the valve seat is closed, that is, a fluidic force acts counter to the valve closing force.

For fastening the fluid housing to the connecting plate, an attachment flange is formed in one piece with the fluid housing, for example. In this way, the valve unit can have a particularly compact design.

According to one embodiment, the attachment flange may include openings having a retaining area for engagement by a fastening means provided on the connecting plate and an insertion area for passage of the fastening means and for releasing the fluid housing from the connecting plate. In particular, the openings may be keyhole-shaped. Such openings allow the fluid housing to be mounted to the connecting plate in a particularly simple manner. When the fastening elements have been inserted in the insertion area, a pre-assembly of the fluid housing to the connecting plate can be effected by a rotation of the fluid housing about an imaginary axis of rotation extending perpendicularly to the connecting surface. After rotation, the fluid housing can no longer be lifted off the connecting plate in a direction perpendicular to the connecting surface. In particular, pre-assembly of the fluid housing to the connecting plate is performed according to a principle similar to that of a bayonet closure.

Another advantage is that the fastening means can be pre-mounted to the connecting plate even before the fluid housing is placed on the connecting plate, since the fastening means can be inserted through the insertion areas in an already mounted state.

In addition, dismounting the fluid housing is simplified since, for dismounting, the fastening means only need to be loosened to such an extent that rotation of the fluid housing is possible. The fastening means are thus held captively on the connecting plate when the fluid housing is dismounted.

According to a further embodiment, at least two mounting hooks in the form of laterally half-open rings that are open in the same circumferential direction are formed on the attachment flange. The mounting hooks also permit a particularly simple assembly; as with the keyhole-shaped openings, the fastening means can be preassembled on the connecting plate already before the fluid housing is placed on the connecting plate. Here, the mounting hooks have the additional advantage that the fastening means do not need to enter an insertion area when the fluid housing is placed on the connecting plate.

The mounting hooks are preferably spaced apart from each other by 180 degrees in the circumferential direction of the fluid housing.

The connecting plate may have fastening means arranged thereon, and the fastening means may be inserted in the mounting hooks such that the fluid housing is fastened to the connecting plate by the fastening means in a force-fitting and form-fitting manner. In this way, the fluid housing is particularly reliably fastened to the connecting plate in a defined position.

The fastening means are, for example, screws the widened screw heads of which press against the top side of the attachment flange when the fluid housing is in the fastened condition and the shank of which extends through the opening or is accommodated in the mounting hook. Screws are particularly inexpensive and provide for a reliable force-fitting and form-fitting attachment.

With the screw head spaced apart from the attachment flange and the screws partially loosened, the mounting hooks are preferably slid onto the shanks by a rotational movement about the imaginary axis of rotation, so that the shanks are seated in their associated mounting hooks. As a result, there is no need to loosen the fastening means completely in order for the fluid housing to be dismounted.

In a top view of the connecting plate, the fluid supply duct and the fluid outlet duct extend along a straight line, for example, and a connecting line between the fastening means includes an angle with the line which is greater than 15 degrees, in particular greater than 25 degrees, for instance 35 degrees. This prevents a depression or hole for receiving the fastening means from colliding with the fluid supply duct or the fluid outlet duct.

According to one embodiment, the fluid housing and the connecting plate have cooperating mechanical positioning means formed thereon, which allow the fluid housing to be mounted to the connecting plate in the first position and in the second position. The positioning means are, for example, a positioning pin and a corresponding recess. The positioning means allow the fluid housing to be mounted to the connecting plate in a defined position, so that the fluid supply duct and the fluid outlet duct in the connecting plate are aligned as precisely as possible with the openings in the fluid housing. The pin may be provided on the fluid housing and the recess may be provided on the connecting plate, or vice versa.

The valve drive may be releasably connected to the fluid housing, in particular by a bayonet closure. This allows the valve drive to be released from the valve unit without the fluid housing having to be dismounted. Furthermore, the valve drive can be mounted to the fluid housing after the fluid housing has been mounted to the connecting plate. This is advantageous in particular when the valve unit is already mounted in an installation space environment and the fluid housing is to be replaced or moved from the first to the second position or vice versa. By detaching the valve drive from the fluid housing, the fastening means can be accessible particularly easily in a confined installation space environment.

Furthermore, the attachment flange, in particular the mounting hooks or the openings, may protrude beyond the valve drive when viewed in a top view of the valve unit. This makes the attachment flange particularly easy to access, even when the valve drive is fastened to the fluid housing.

DETAILED DESCRIPTION

Figure 1:
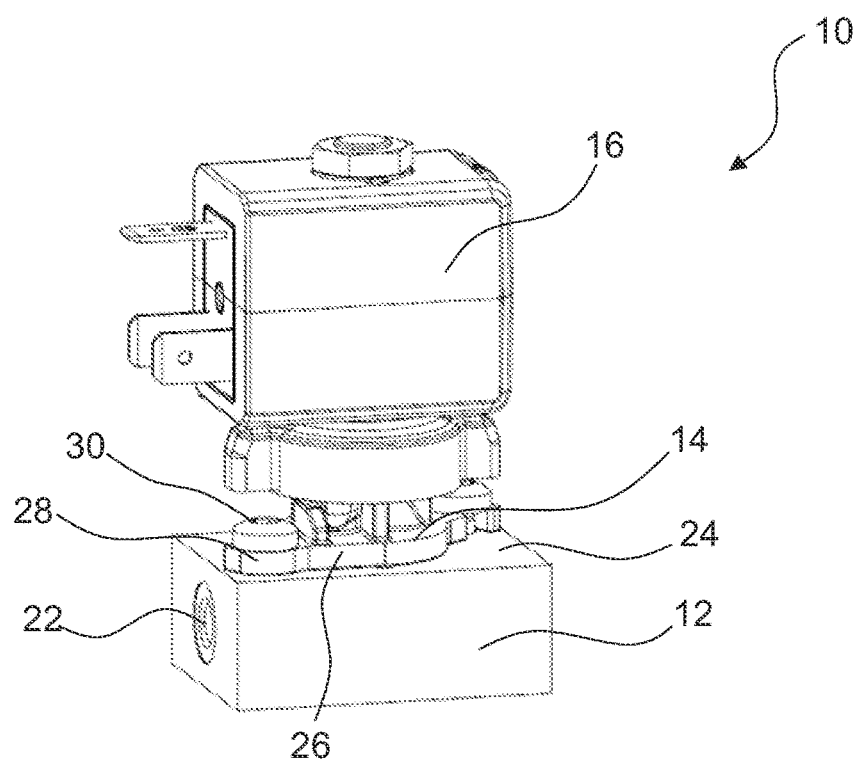
FIG. 1 shows a valve unit according to the invention.

FIG. 1 shows a valve unit 10 having a connecting plate 12, a fluid housing 14 and a valve drive 16.

If required, a plurality of valve units 10 may be arranged in parallel. In this case, the connecting plates 12 of the various valve units 10 may be formed as a continuous plate, rather than separately.

The valve drive 16 is, for example, a solenoid actuator.

Figure 4:
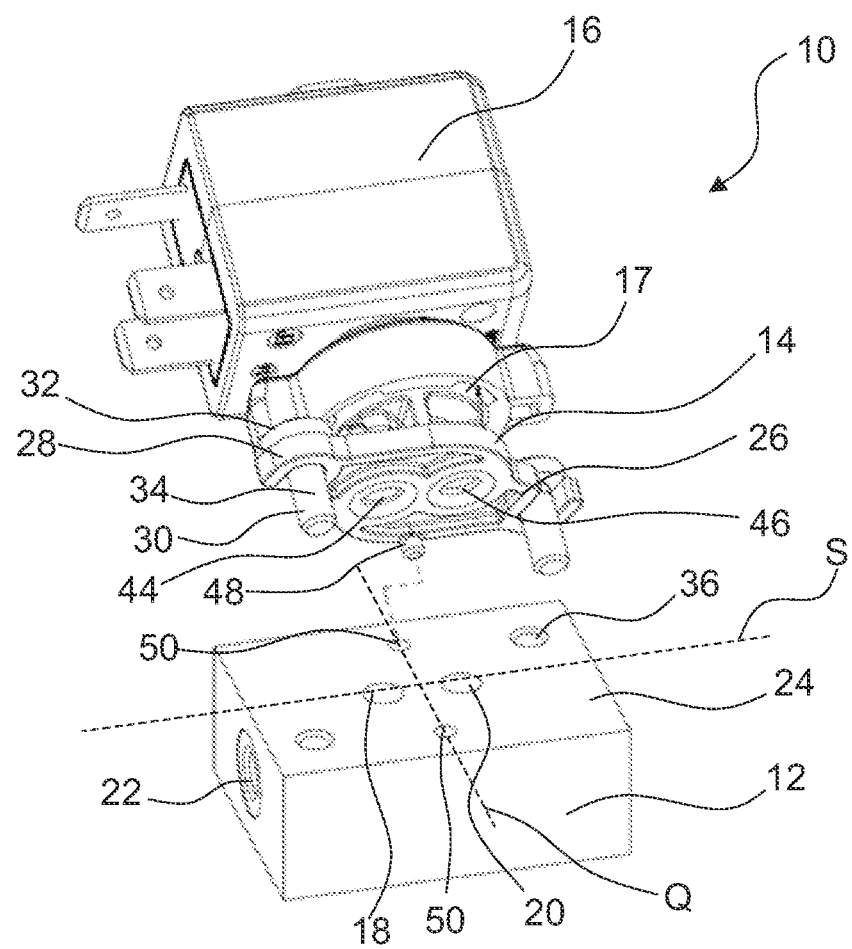
FIG. 4 shows a further view of the valve unit according to the invention in the disassembled state.

The valve drive 16 is preferably releasably secured to the fluid housing 14, for example by a bayonet closure 17, which can be partially seen in FIG. 4. A bayonet closure is, in particular, a ring-shaped quick-release closure. The connection is effected by a plug-and-turn movement. The two parts to be connected, that is, the valve drive 10 and the fluid housing 14, are placed one inside the other and subsequently pressed against each other by a rotary movement. To lock the connection, longitudinal and transverse slots then engage with each other and, as with a thread, allow a connection to be made by turning.

The connecting plate 12 has a fluid supply duct 18 and a fluid outlet duct 20 formed therein (see FIG. 5); only an inlet 22 of the fluid supply duct 18 is visible in FIG. 1.

The connecting plate 12 further has a connecting surface 24 to which the fluid housing 14 is mounted.

Figure 2:
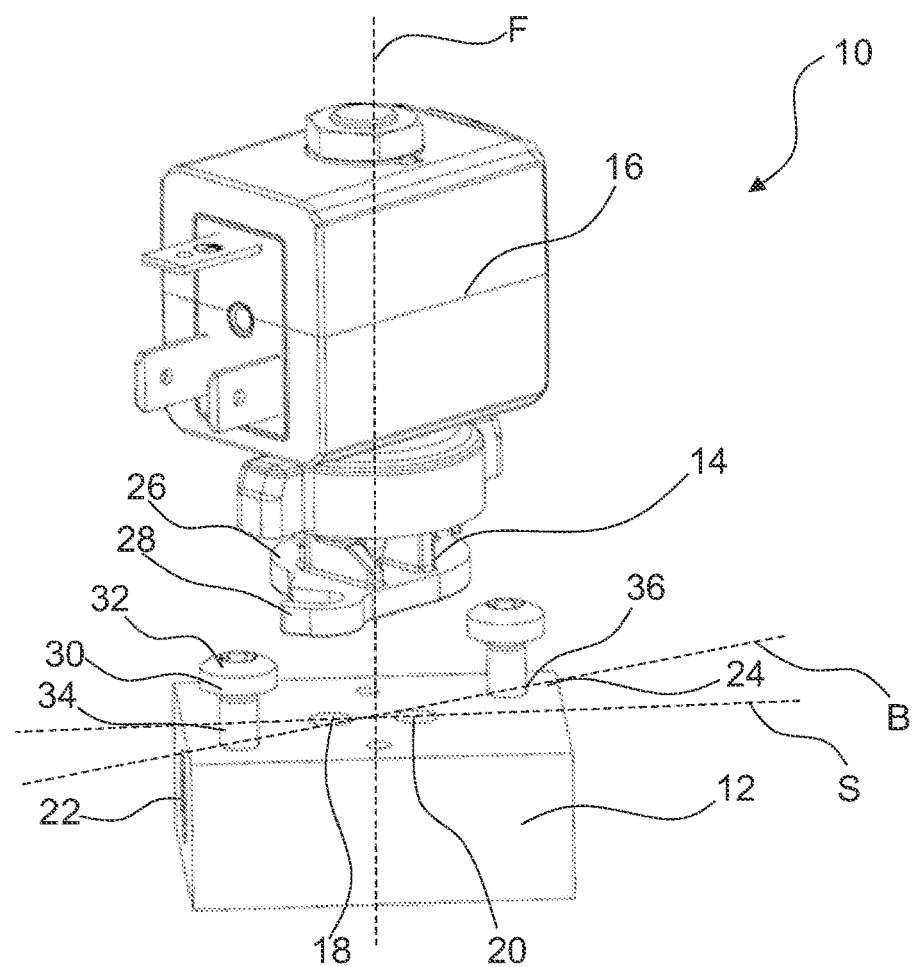
FIG. 2 shows the valve unit according to the invention in a partly disassembled state.

In FIG. 2, which shows the valve unit 10 in a partly disassembled state, it can be seen that the fluid supply duct 18 and the fluid outlet duct 20 open into the connecting surface 24.

An attachment flange 26, which is formed in one piece with the fluid housing 14, is provided for mounting the fluid housing 14 to the connecting plate 12.

In the exemplary embodiment illustrated, at least two mounting hooks 28 in the form of laterally half-open rings that are open in the same circumferential direction are formed on the attachment flange 26.

The connecting plate 12 has fastening means 30 arranged thereon, which cooperate with the mounting hooks 28.

When the fluid housing 14 is mounted to the connecting plate 12, as illustrated in FIG. 1, the fastening means 30 are inserted in the mounting hooks 28. As a result, the fluid housing 14 is secured to the connecting plate 12 in a force-fitting and form-fitting manner by the fastening means 30.

In the exemplary embodiment, the fastening means 30 are formed by screws which each have a screw head 32 and a shank 34 and are screwed into holes 36 in the connecting plate 12.

In the fastened state of the fluid housing 14, a respective shank 34 is received in each mounting hook 28.

When the fluid housing 14 is in the fastened condition, the widened screw heads 32 of the fastening means 30 press against the top side of the attachment flange 26 and consequently press the fluid housing 14 against the connecting plate 12.

For assembly, with the screw heads 32 spaced apart from the attachment flange 26 and the screws partially loosened, the mounting hooks 28 can be slid onto the shanks 34 by a rotational movement about an imaginary axis of rotation F that extends perpendicularly to the connecting surface 24 so that the shanks 34 are seated in their associated mounting hooks 28.

The open side of each mounting hook points in the same direction of rotation with respect to the imaginary axis of rotation F.

Correspondingly, disassembly can be carried out with the screws slightly loosened, by rotating the fluid housing 14 about the imaginary axis of rotation F until the mounting hooks 28 are out of engagement with the screws.

Figure 5:
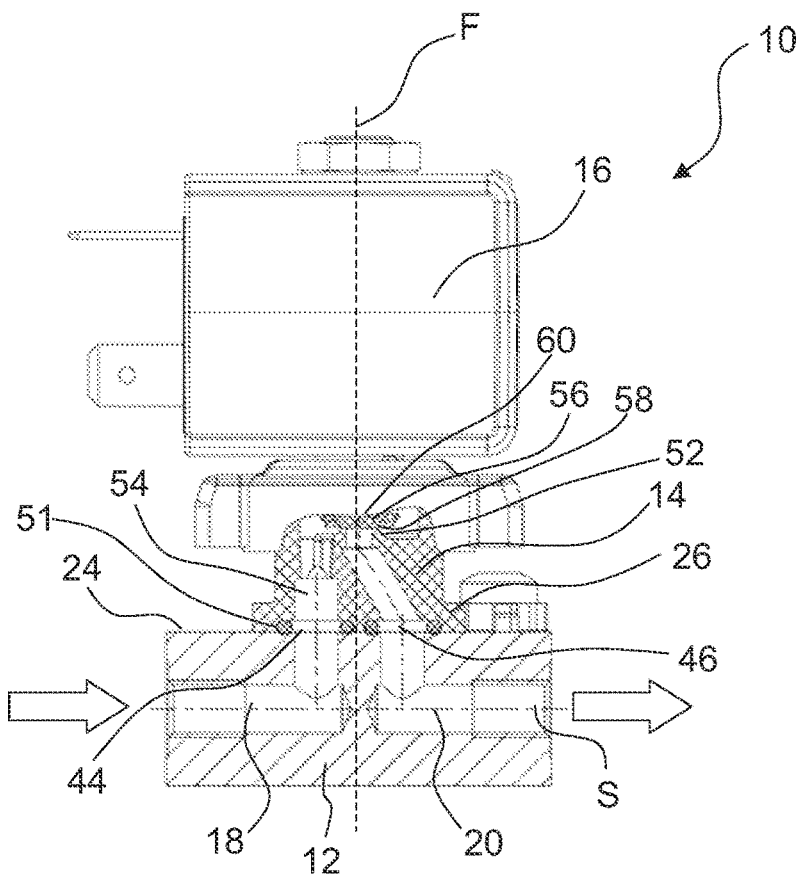
FIG. 5 shows a partial sectional illustration of the valve unit according to the invention.

The fluid supply duct 18 and the fluid outlet duct 20 extend along a straight line S in a top view of the connecting plate 12 (see also FIG. 5).

A connecting line B between the fastening means 30 includes an angle with the line S which is greater than 15 degrees, in particular greater than 25 degrees, for example 35 degrees. This ensures that the holes 36 do not collide with the fluid supply duct 18 and the fluid outlet duct 20.

Preferably, the attachment flange 26 protrudes beyond the valve drive 16 when viewed in a top view of the valve unit 10. This allows the fastening means 30 to be positioned such that they are particularly easy to access.

Figure 3:
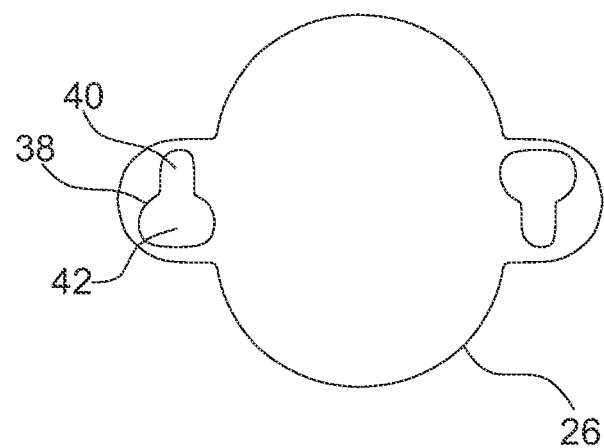
FIG. 3 shows an outline of an attachment flange.

FIG. 3 shows an outline of a further attachment flange 26 that may be formed on the fluid housing 14 as an alternative to the attachment flange 26 illustrated in FIGS. 1 and 2.

The attachment flange 26 illustrated in FIG. 3 has openings 38 with a retaining area 40 and an insertion area 42.

The retaining areas 40 serve for engagement by the fastening means 30, in particular the screw head 32.

The insertion areas 42 serve for passage of the fastening means 30, in particular the screw head 32, and for detaching the fluid housing 14 from the connecting plate 12.

More precisely, the fluid housing 14 may be mounted by inserting each of the screw heads 32 through the insertion area 42 of an opening 38, rotating the fluid housing 14 such that the screw heads 32 are positioned within the retaining area 40, and then tightening the fastening means 30 so that the screw heads 32 apply a pressure on the top side of the attachment flange 26.

In a further alternative embodiment, not shown for the sake of simplicity, the mounting hooks 28 are open in opposite circumferential directions rather than in the same circumferential direction. In this case, the fluid housing 14 is slid laterally onto the fastening means 30.

FIG. 4 shows the valve unit 10 in a disassembled state, wherein the fluid housing 14 with the valve drive 16 is illustrated in a bottom view.

In this view, first and second openings 44, 46 of the fluid housing 14 can be seen.

The two openings 44, 46 are in fluid communication with the fluid supply duct 18 and the fluid outlet duct 20 when the fluid housing 14 is mounted to the connecting plate 12.

FIG. 4 further shows that the fluid housing 14 and the connecting plate 12 have cooperating mechanical positioning means formed thereon.

In particular, the positioning means comprise a pin 48 and two recesses 50 in the connecting surface 24 of the connecting plate 12, the pin 48 being adapted to selectively engage in a first or a second recess 50. The pin 48 is, for example, a cylindrical pin.

The positioning means allow the fluid housing 14 to be mounted to the connecting plate 12 in a first position and in a second position rotated in relation to the first position through 180 degrees relative to an imaginary axis of rotation F extending perpendicularly to the connecting surface 24.

In particular, the fluid housing 14 is fixed in the first position and in the second position by the positioning means in a defined position so as to prevent rotation.

In a top view of the connecting plate 12, the recesses 50 are arranged, for example, on a line Q that extends at an angle to the line S, in particular at an angle of 90 degrees.

When dismounting the fluid housing 14, the fastening means 30 have to be loosened sufficiently for the pin 48 to be disengaged from the recess 50. Only then can the fluid housing 14 be rotated to disengage the mounting hooks 28 from the shank 34 or to position the fastening means 30 in the insertion area 42 so that the fluid housing 14 can be removed from the connecting plate 12. When the fluid housing 14 is mounted, the fastening means 30 also have to be loosened to a corresponding extent.

In both the first position and the second position of the fluid housing 14, the openings 44, 46 are in fluid communication with the fluid supply duct 18 and the fluid outlet duct 20. However, in the first position, the first opening 44 is in fluid communication with the fluid supply duct 18 and the second opening 46 is in fluid communication with the fluid outlet duct 20, and vice versa in the second position.

To provide a fluid-tight seal at the interface between the connecting plate 12 and the fluid housing 14, sealing rings 51 are provided which are inserted in the fluid housing 14 and surround the openings 44, 46.

In FIG. 4, as well as in FIG. 5, which shows a partial sectional illustration of the valve unit 10, the fluid housing 14 is shown in the first position.

As can be seen in FIG. 5, the fluid supply duct 18 and the fluid outlet duct 20 are diverted by, e.g., 90 degrees in the connecting plate 12.

FIG. 5 further shows that a valve seat 52 is formed in the fluid housing 14, with a fluid duct 54 extending from the first opening 44 across the valve seat 52 to the second opening 46.

A valve closing body 56 cooperates with the valve seat 52.

During operation of the valve unit 10, the valve closing body 56 comes into contact with the fluid on a face side 58 facing the valve seat 52 and on a side 60 facing away from the valve seat 52.

In the first position of the fluid housing 14, a flow over the seat takes place. This means that the fluid flows in the same direction as a valve closing force of the valve closing body 56 acts.

Figure 6:
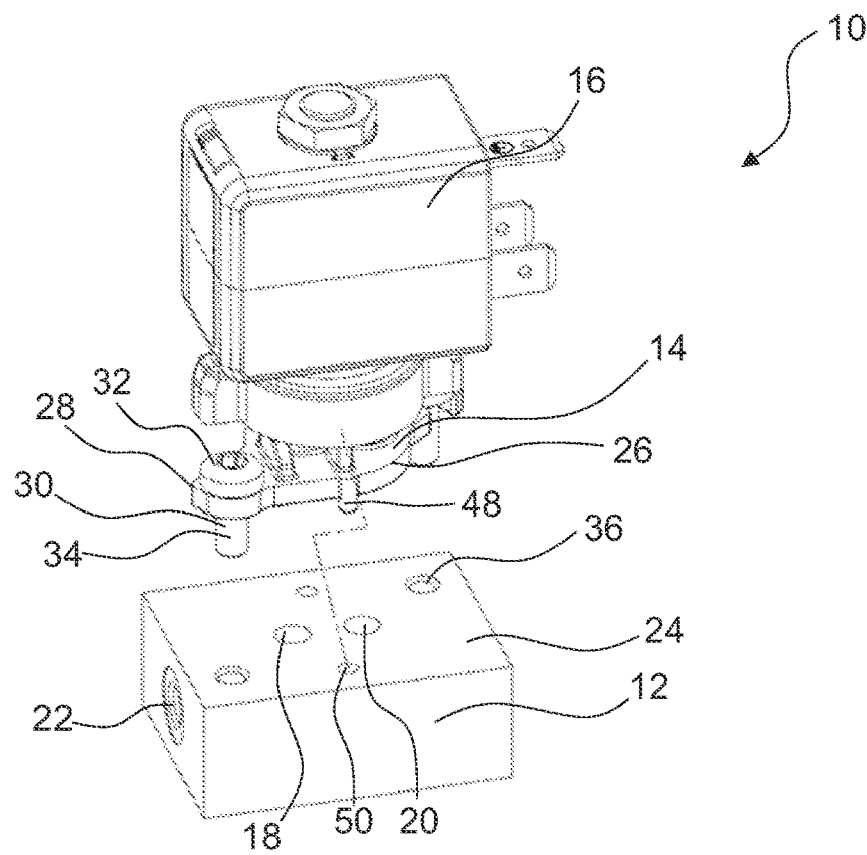
FIG. 6 shows a further view of the valve unit according to the invention in the disassembled state.
Figure 7:
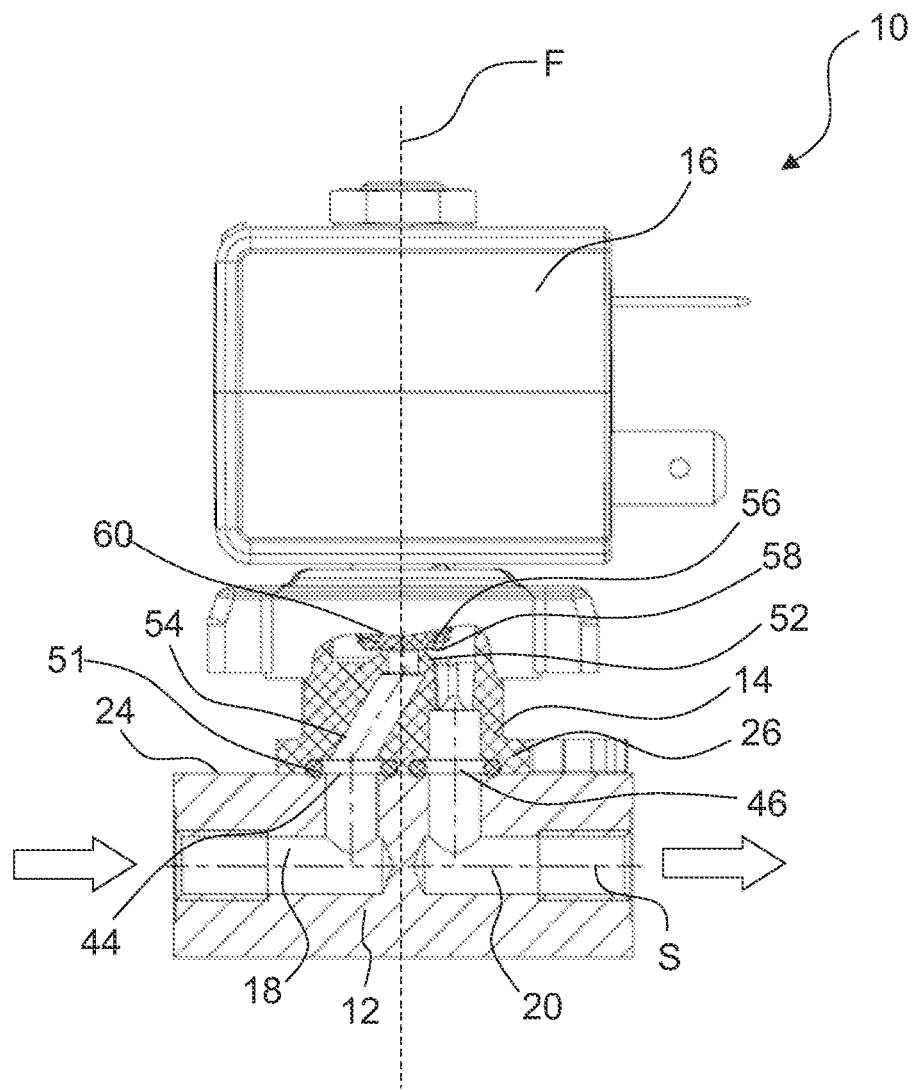
FIG. 7 shows a further partial sectional illustration of the valve unit according to the invention.

FIGS. 6 and 7 illustrate the valve unit 10, with the fluid housing 14 being in the second position.

In the second position of the fluid housing 14, a flow under the seat takes place. This means that the fluid presses against the valve closing body 56 with the valve seat 52 closed.

Consequently, a change in the position of the fluid housing 14 allows a different flow against the valve seat 52 or the valve closing body 56 to be achieved while the direction of flow of the fluid through the connecting plate 12, which is illustrated by arrows in FIGS. 5 and 7, remains the same.

As a result, a valve unit 10 as illustrated in FIGS. 1 to 7 allows a flow against the valve seat 52 to be changed by changing the position of the fluid housing 14 without changing the direction of flow of the fluid.

The invention claimed is:

1. A valve unit comprising a fluid housing through which a fluid duct extends from a first opening across a valve seat to a second opening,
    a valve drive connected to the fluid housing and configured to drive a valve closing body cooperating with the valve seat, the valve closing body coming into contact with the fluid in operation on the face side facing the valve seat and on a side facing away from the valve seat,
    a connecting plate having a connecting surface to which the fluid housing can be mounted and in which a fluid supply duct and a fluid outlet duct are formed, which each open into the connecting surface and which, in the assembled state of the valve unit, are in fluid communication with the fluid duct in the fluid housing by the first and second openings,
    wherein the fluid housing is adapted to be mounted to the connecting plate in a first position and in a second position rotated in relation to the first position through 180 degrees relative to an imaginary axis of rotation extending perpendicularly to the connecting surface, wherein during operation of the valve unit, with a direction of flow of the fluid through the connecting plate remaining unchanged, a flow over the seat takes place in the first position and a flow under the seat takes place in the second position.

2. The valve unit according to claim 1, wherein for fastening the fluid housing to the connecting plate, an attachment flange is formed in one piece with the fluid housing.

3. The valve unit according to claim 2, wherein the attachment flange includes openings having a retaining area for engagement by a fastener provided on the connecting plate and an insertion area for passage of the fastener and for releasing the fluid housing from the connecting plate.

4. The valve unit according to claim 3, wherein the fasteners are screws the widened screw heads of which press against the top side of the attachment flange when the fluid housing is in the fastened condition, and the shank of which extends through the opening or is received in the mounting hook.

5. The valve unit according to claim 2, wherein at least two mounting hooks in the form of laterally half-open rings that are open in the same circumferential direction are formed on the attachment flange.

6. The valve unit according to claim 5, wherein the connecting plate has fasteners arranged thereon and the fasteners are inserted in the mounting hooks such that the fluid housing is fastened to the connecting plate in a force-fitting and form-fitting manner by the fasteners.

7. The valve unit according to claim 6, wherein the fasteners are screws the widened screw heads of which press against the top side of the attachment flange when the fluid housing is in the fastened condition, and the shank of which extends through the opening or is received in the mounting hook, and wherein with the screw head spaced apart from the attachment flange and the screws partially loosened, the mounting hooks are slid onto the shanks by a rotational movement about the imaginary axis of rotation, so that the shanks are seated in their associated mounting hooks.

8. The valve unit according to claim 2, wherein in a top view of the connecting plate, the fluid supply duct and the fluid outlet duct extend along a straight line and a connecting line between the fasteners includes an angle with the line which is greater than 15 degrees.

9. The valve unit according to claim 2, wherein the attachment flange protrudes beyond the valve drive when viewed in a top view of the valve unit.

10. The valve unit according to claim 1, wherein the fluid housing and the connecting plate have cooperating mechanical positioners formed thereon, allowing the fluid housing to be mounted to the connecting plate in the first position and in the second position.

11. The valve unit according to claim 1, wherein the valve drive is releasably connected to the fluid housing.

12. The valve unit according to claim 1, wherein the valve drive is releasably connected to the fluid housing by a bayonet closure.

* * * * *